United States Patent
Reinecke et al.

(10) Patent No.: US 10,462,965 B2
(45) Date of Patent: Nov. 5, 2019

(54) CROP RESIDUE MANAGEMENT DEFLECTOR

(71) Applicant: CNH Industrial America LLC, New Holland, PA (US)

(72) Inventors: Clay Reinecke, Blue Grass, IA (US); Justin Montenguise, Bettendorf, IA (US); Nicholas Shane, Bennett, IA (US)

(73) Assignee: CNH Industrial America LLC, New Holland, PA (US)

(*) Notice: Subject to any disclaimer, the term of this patent is extended or adjusted under 35 U.S.C. 154(b) by 386 days.

(21) Appl. No.: 15/134,769

(22) Filed: Apr. 21, 2016

(65) Prior Publication Data

US 2016/0316623 A1    Nov. 3, 2016

Related U.S. Application Data

(60) Provisional application No. 62/155,139, filed on Apr. 30, 2015.

(51) Int. Cl.
   *A01D 41/12*  (2006.01)

(52) U.S. Cl.
   CPC .................. *A01D 41/1243* (2013.01)

(58) Field of Classification Search
   CPC .................................. A01D 41/1243
   USPC .................. 460/111–113, 901, 119
   See application file for complete search history.

(56) References Cited

U.S. PATENT DOCUMENTS

| | | | | |
|---|---|---|---|---|
| 2,854,046 A | * | 9/1958 | Devorak | A01D 41/1243 56/192 |
| 2,969,862 A | * | 1/1961 | Worrell | A01D 41/1243 193/3 |
| 4,511,090 A | | 4/1985 | Morgan | |
| 4,892,504 A | | 1/1990 | Scott et al. | |
| 5,947,391 A | * | 9/1999 | Beck | E01C 19/203 239/677 |
| 6,602,131 B2 | | 8/2003 | Wolters | |
| 6,616,528 B2 | * | 9/2003 | Wolters | A01F 12/40 460/111 |
| 6,719,627 B2 | * | 4/2004 | Wolters | A01F 12/40 460/111 |

(Continued)

FOREIGN PATENT DOCUMENTS

EP    0631717 A1 *  1/1995  ......... A01D 41/1243

*Primary Examiner* — Thomas B Will
*Assistant Examiner* — Joan D Misa
(74) *Attorney, Agent, or Firm* — Peter K. Zacharias; Patrick M. Sheldrake

(57) ABSTRACT

An agricultural harvester with a crop processing apparatus. The crop processing apparatus is configured for separating crop material from crop residue and for discharging crop residue therefrom. The agricultural harvester includes a duct for directing a stream of crop residue downstream in the agricultural combine in a generally downward direction, a pair of laterally spaced spreader devices positioned downstream of and below the crop residue duct for distributing crop residue laterally, and deflectors spaced outwardly of the spreader devices and oriented generally in a vertical plane. The deflectors are mounted at a first upstream edge relative to the flow of the crop residue stream and extend downstream. The deflectors have an upper edge curved toward the spreader devices to an increasing extent away from the upstream edge.

15 Claims, 5 Drawing Sheets

(56) References Cited

U.S. PATENT DOCUMENTS

| | | | |
|---|---|---|---|
| 6,769,980 B2 * | 8/2004 | Wolters | A01D 41/1243 460/112 |
| 7,487,024 B2 * | 2/2009 | Farley | A01D 41/1243 701/50 |
| 7,635,299 B2 * | 12/2009 | Murray | A01D 41/1243 460/111 |
| 8,147,303 B2 | 4/2012 | Lauer et al. | |
| 8,210,915 B2 * | 7/2012 | Holmen | A01D 41/1243 460/111 |
| 8,876,583 B2 * | 11/2014 | Roberge | A01D 41/1243 460/111 |
| 9,801,339 B2 * | 10/2017 | Roberge | A01D 41/1243 |
| 2013/0324199 A1 | 12/2013 | Roberge et al. | |

\* cited by examiner

CROP RESIDUE MANAGEMENT DEFLECTOR

CROSS REFERENCE TO RELATED APPLICATION

This application claims the benefit of U.S. Provisional Patent Application No. 62/155,139, entitled "Crop Residue Management Deflector" and filed Apr. 30, 2015, the contents of which are incorporated herein by reference.

FIELD OF THE INVENTION

The present invention relates to agricultural harvesters such as combines, and, more particularly, to crop residue systems used in such combines.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed, it falls through perforations in the concaves onto a grain pan. From the grain pan, the grain is cleaned using a cleaning system, and is then transported to a grain tank onboard the combine. A cleaning fan blows air through the sieves to discharge straw, chaff and other debris toward the rear of the combine.

During the process of harvesting, crop material other than grain (MOG) is intended to be expelled from the combine. This material is usually derived from one of two areas, the threshing rotor or the cleaning system. The material expelled from the threshing rotor is generally referred to as "straw" and the material expelled from the cleaning system is generally referred to as "chaff." This crop residue can be dealt with in several ways, generally categorized as spread and windrowed.

"Spread" refers to using a mechanical device to distribute the straw and/or chaff evenly across the width of the combine header cut width. This spread material is usually chopped to as short a length as possible so that when it is spread it will break down as quickly as possible and not interfere with tillage or seeding operations.

"Windrowing" refers to the process of dropping straw directly behind the combine in a continuous stream. The purpose of doing this is usually to allow post harvest processing of the straw such as shaping it into bales. In this process, the straw is usually allowed to pass through the combine with as little interference as possible so that it remains as close as possible to its original length and condition.

When the crop residue is spread in a lateral direction, planar deflectors are positioned outboard of the spreading devices to control the width of the material of the crop residue so distributed. The deflectors control this stream, but also prevent the crop residue from interfering with the wheels and steering mechanism located in the aft section of the combine. Currently, deflectors are made oversized to prevent the crop residue from passing over the top and into unwanted locations.

Accordingly, what is needed in the art is an efficient deflector for managing the distribution of crop residue in a combine.

SUMMARY OF THE INVENTION

In accordance with an aspect of the present invention, there is provided an apparatus for crop residue management having efficiently sized and configured deflectors.

In accordance with another aspect of the present invention, there is provided a crop residue apparatus for distribution of crop residue including a pair of laterally spaced spreader devices for distributing crop residue laterally. A duct is provided for directing a crop residue stream to the spreader devices in a downward direction. Deflectors are spaced outward of the spreader devices and oriented generally in a vertical plane. The deflectors are mounted at a first upstream edge relative to the flow of the crop residue stream and they extend downstream. The deflectors have an upper edge that is curved toward the spreader devices to an increasing extent away from the upstream edge.

In accordance with yet another aspect of the present invention, there is provided an agricultural combine including a crop processing apparatus separating crop material from crop residue containing straw and chaff and for discharging crop residue therefrom in a stream. A duct is provided for directing a stream of crop residue material downstream in the combine in a generally downward direction. Laterally spaced spreader devices are positioned downstream of and below the duct for distributing crop residue laterally. Deflectors are spaced outward of the spreader devices and oriented generally in a vertical plane. The deflectors are mounted at a first upstream edge relative to the flow of the crop residue stream and they extend downstream. The deflectors have an upper edge curved towards the spreader device to an increasing extent away from the upstream edge.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
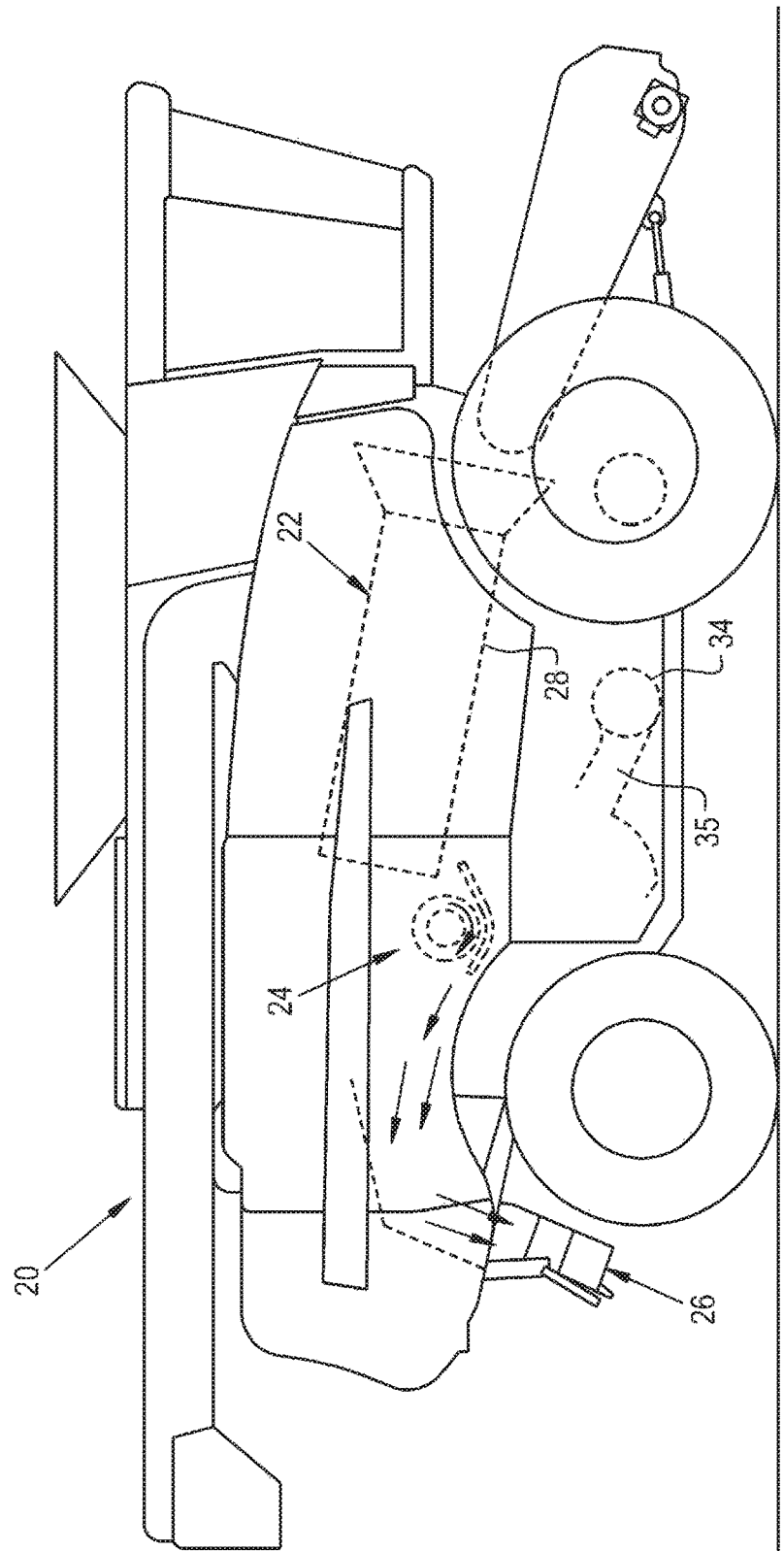
FIG. 1 is a side view of an embodiment of an agricultural harvester in the form of a combine which may include a crop residue system, in accordance with an exemplary embodiment of the present invention.

FIG. 1 shows an agricultural combine 20 which includes the usual harvesting apparatus (not all of which is shown to facilitate an understanding of the invention). An axially oriented crop processing system 22 receives harvested crop and a crop residue treatment and distribution system 24 with a crop residue spreader 26 is positioned at the aft end of combine 20. The crop processing system includes a cylindrical threshing rotor 28 that conveys a flow of crop material in a helical flow path. As the crop material is moved through the processing apparatus 22, the desired crop such as grain or other material is loosened and separated from crop residue such as husk and pods in a cleaning system located beneath the threshing rotor 28. The crop processing system 22 includes a blower 34, schematically depicted to aid in the separation of the desired crop from the crop residue. The blower 34 has a duct 35 extending aft in the combine 20 towards the cleaning system and the crop residue treatment and distribution system 24.

Figure 2:
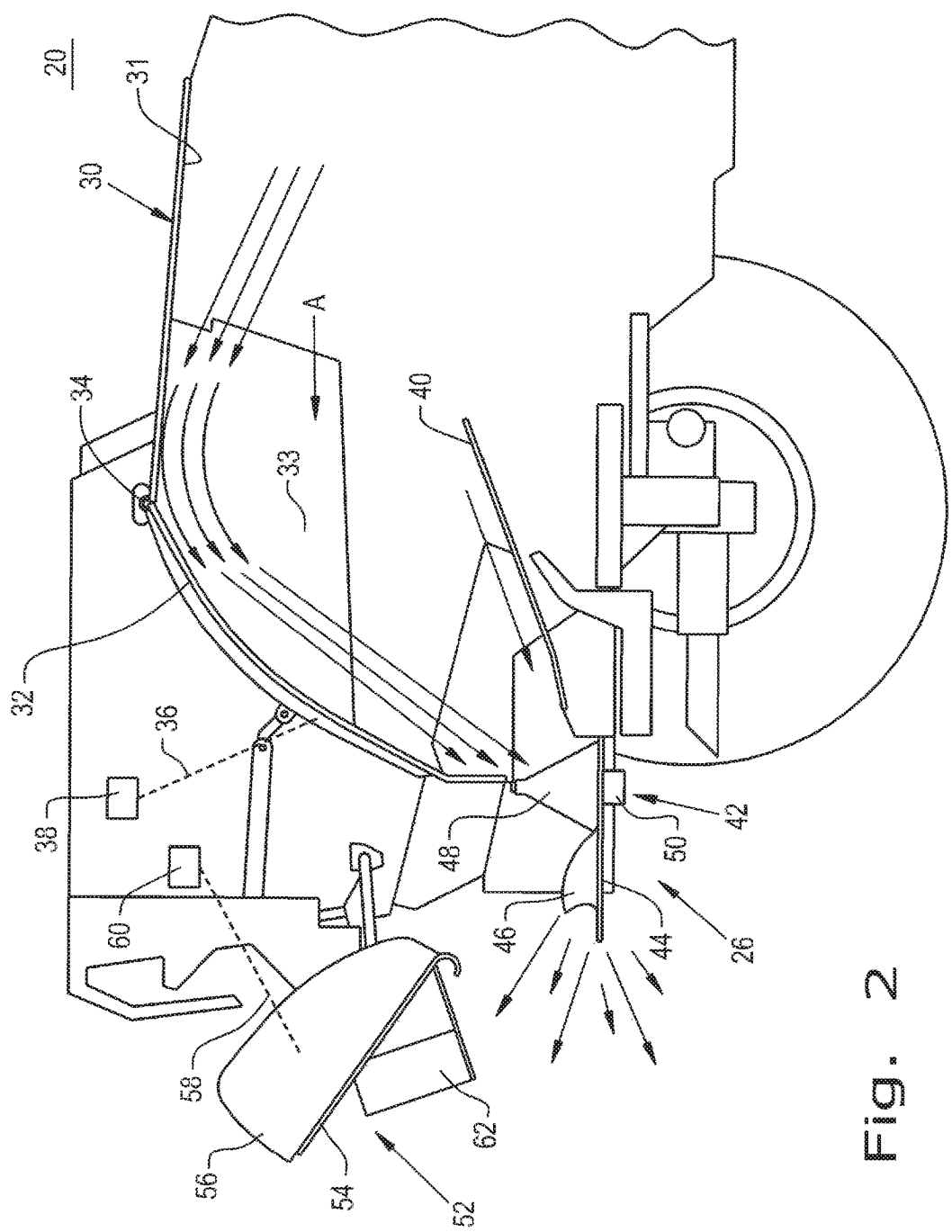
FIG. 2 is a side view in section of the agricultural of the agricultural harvester of FIG. 1 showing a position in which crop residue is distributed laterally, in accordance with an exemplary embodiment of the present invention.

Specifically referring to FIG. 2, the crop residue spreader system comprises a duct 30 including a top wall 31 and sidewalls 33 to direct crop residue in an aft direction A. A swath door 32 spans the sidewalls of the duct 30 and is pivotally mounted at 34 to be displaced between the positions shown in FIG. 2 to an upper position (not shown). As shown in schematic fashion, the swath door 32 is displaced by a mechanical interconnection 36 to an actuating mechanism 38, both shown in schematic fashion. Although many different elements may be used to displace swath door 32 between its positions, the mechanism described in U.S. patent application Ser. No. 13/934,388, entitled "Actuation Linkage for Flexible Crop Residue Management" and filed Jul. 3, 2013, the contents of which are incorporated by reference herein, is desired. A fixed floor 40 directs the crop residue stream towards a pair of spreader devices 42.

Spreader devices 42 include side-by-side disks 44 journaled for rotation about vertical axis and positioned laterally with respect to one another. Disks 44 have a plurality of curved bats 46 that act like vanes to positively direct crop residue in a lateral direction. A cone 48 extends vertically upward from disk 44 and provides a cover for a motor 50 for each disk. The motor output shafts (not shown) cause the disks 44 to rotate as needed. Although motor 50 is illustrated as hydraulic, it may be in any one of a number of forms including mechanical interconnection to a remotely positioned motor. Rotation of disks 44 is set up so that when viewed from above and looking towards the front of the combine 20, the right side disk rotates counterclockwise and the left disk rotates clockwise so that they propel crop residue between them aft and around and laterally.

In the position illustrated in FIG. 2, both the straw and chaff are directed aft in direction A and are deflected downward by swath door 32 to impact on the disks 44 and curved bats 46. The rotation of the disks 44 causes the material to be distributed aft and laterally of the combine 20.

A windrow chute generally indicated at 52 is provided to enable crop residue management flexibility. Windrow chute includes a bottom portion 54 and adjacent sidewalls 56. Bottom portion 54 is tapered in a rearward direction. Windrow chute 52 is displaceable between the position illustrated in FIG. 2 in which it is out of the crop residue stream and a position in which it directs the crop residue stream into a windrow (not shown). Windrow chute 52 is displaced by a mechanical connection 58 leading to an actuator 60. Windrow chute 52 additionally includes deflectors 62 and 64 fixed to and projecting downwardly from bottom portion 54.

In the position shown in FIG. 2, the windrow chute 52 is in a position in which it is positioned out of the crop residue stream and the swath door 32 is in its first lowered position in which it directs all of the crop residue stream towards the spreader devices 42.

Figure 3:
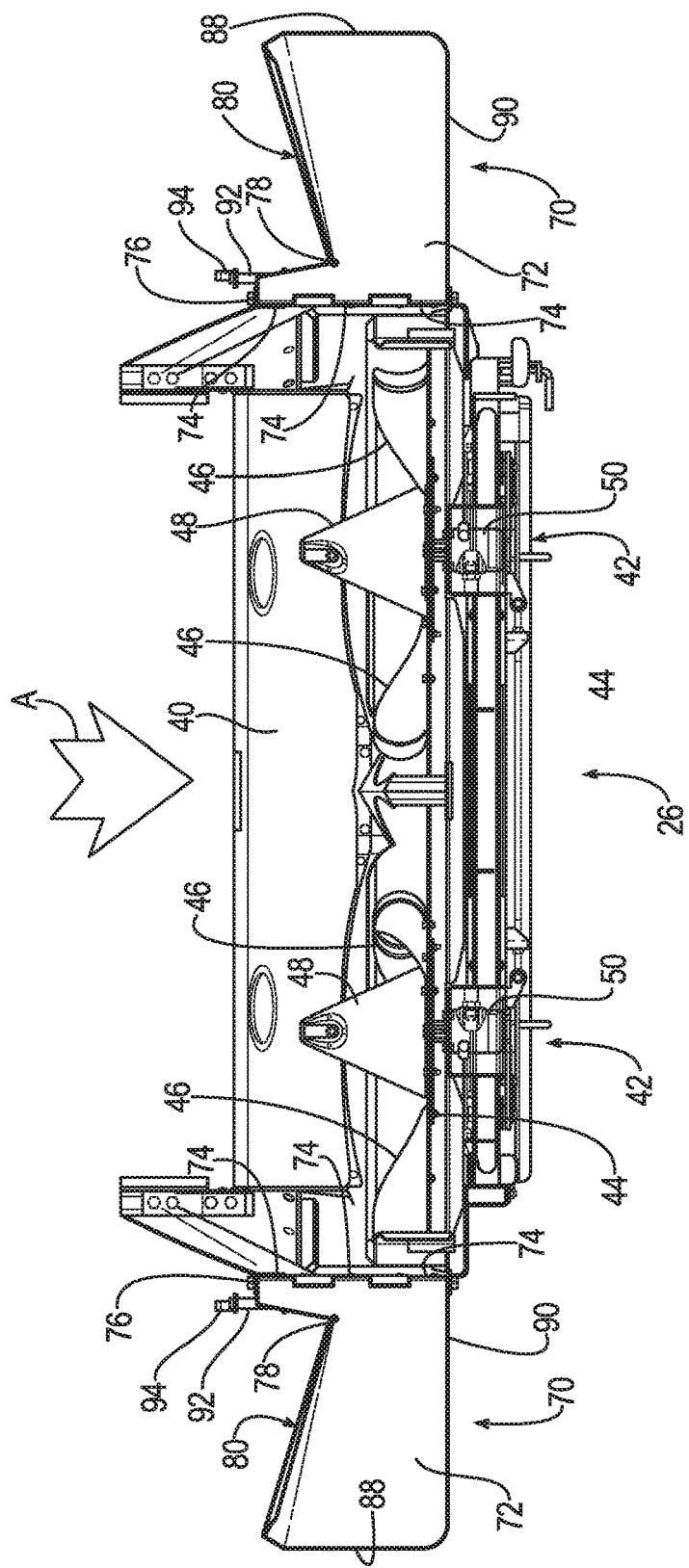
FIG. 3 is an aft view of the harvester of FIG. 1 looking forward showing the defectors in a position for laterally distributing crop residue, in accordance with an exemplary embodiment of the present invention.
Figure 4:
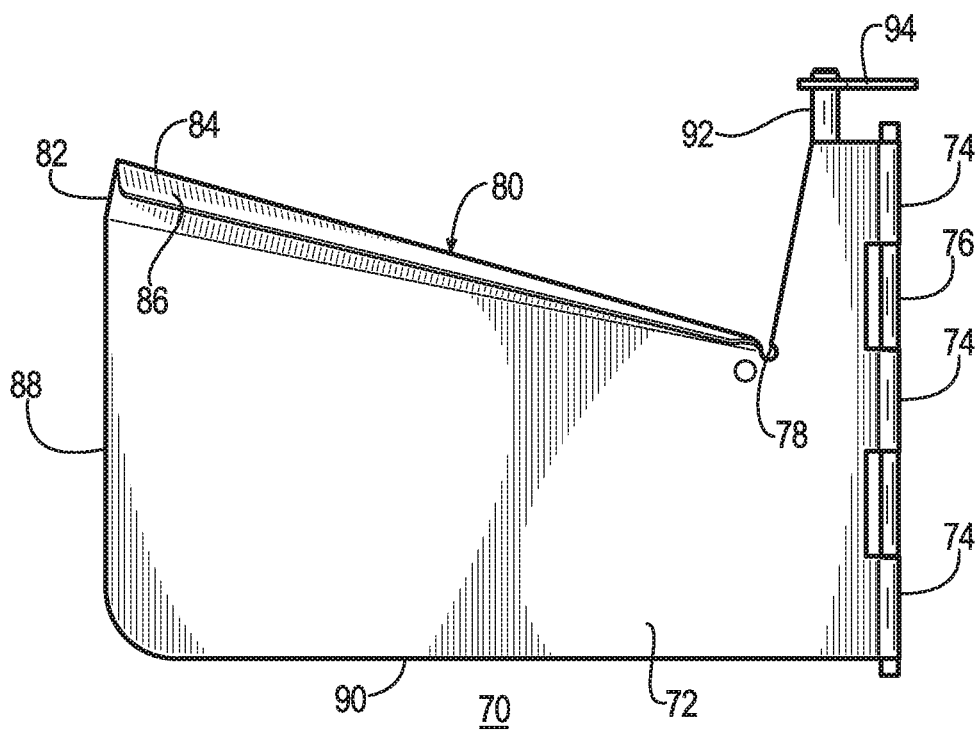
FIG. 4 is a side view of one of the deflectors of the crop residue management system of FIG. 4, in accordance with an exemplary embodiment of the present invention.

Referring now to FIG. 3, deflectors 70, embodying the present invention, are illustrated. The deflectors 70 are each located outward of the spreader devices 42. Each deflector 70 is formed from a plate or sheet 72 having an upstream edge 74 curved around to form a hinge with pin 76 affixed to the frame of the combine. An upstream point 78 adjacent the upstream edge 74 is the beginning of an upper edge 80 that curves towards the spreading devices 42 to a greater extent as the upper edge 80 is farther from point 78 reaching a maximum curvature at the downstream edge 88. The curved configuration may take a number of forms but as shown in FIG. 4 it includes triangular sections 82, 84 and 86 having coincident apexes at point 78 adjacent the upstream edge 74. It can be seen particularly in FIG. 4 that the extent to which the upper edge 80 extends towards the spreader devices 42 increases to a maximum at the downstream edge 88. The triangular sections 82, 84 and 86 could be separate elements joined together but a more practical implementation is to stamp the sections out in a press. It should also be noted that the upper edge 80, in addition to curving to a greater extent toward the spreader devices 42 as it approaches downstream edge 88, extends upward relative to a lower edge 90 which is substantially horizontal to a ground plane.

The configuration thus illustrated enables a minimum size for the deflectors 70 and an increasing curve inward towards the downstream edge 88 to more effectively prevent spilling of crop residue over the top edge. The resulting configuration is a simplified yet highly effective way to control the distribution of crop residue.

The deflectors 70 are shown as pivotal about pin 76 and a crank arm 92 and lever 94 connected to a suitable input on the combine allow the degree to which the deflectors 70 diverge to be adjusted.

Figure 5:
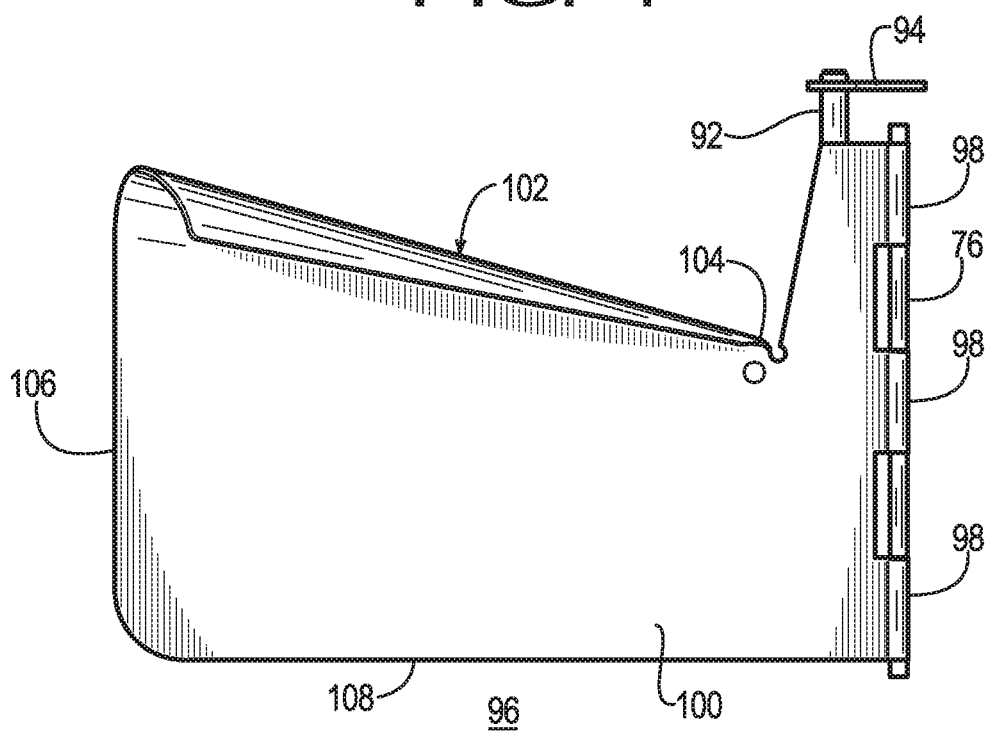
FIG. 5 is a side view of one of the deflectors of the crop residue management system of FIGS. 1 and 2 showing an alternate configuration, in accordance with an exemplary embodiment of the present invention.

The configuration of deflectors 70 shows one way in which to achieve an increasingly curved upper edge towards the downstream edge. The deflector 96 illustrated in FIG. 5 shows another configuration that realizes the same benefits of the invention.

Deflector 96 has a rolled upstream edge 98 connected to a plate or sheet 100 having an upper edge 102 that is in the shape of a cone having as its apex a point 104 adjacent the upstream edge and expanding to its maximum at a downstream edge 106. It can be seen that the upper edge 102 curves to a greater extent towards the downstream edge 106 of the deflector 96. In addition, the upper edge 102 extends upward from the point 104 relative to bottom edge 108 that is substantially parallel to a ground plane. This configuration achieves the same benefits as shown in the configuration of FIG. 4.

Figure 6:
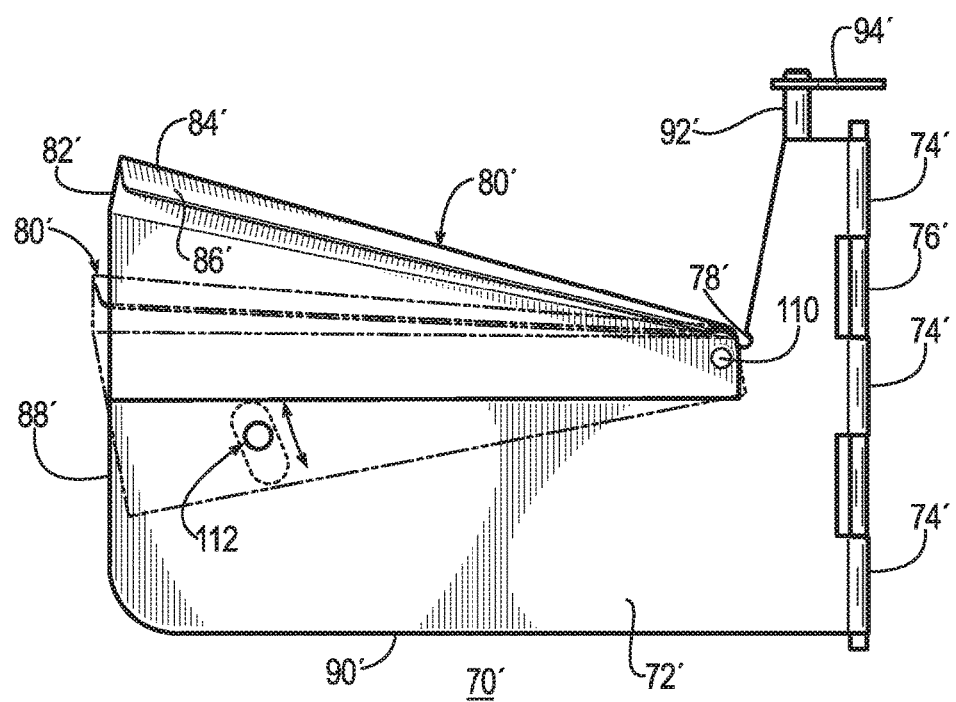
FIG. 6 is a side view of one of the deflectors of the crop residue management system of FIGS. 1 and 2 showing another configuration, in accordance with an exemplary embodiment of the present invention.

It is also possible to provide the deflectors with variable geometry, as shown in FIG. 6. In this Fig., like parts are given like numbers but with a prime. A deflector 70' has the pivotal upstream edge 74' but has a variable geometry upper edge 80' in the form of a section pivotal about a pin 110 on sheet 72'. An adjustment feature 112 allows the upper edge 80' to be pivoted between its uppermost position shown in solid lines and any one of a number of lower positions, one of which is shown in dashed lines. This allows the throw of the crop residue to be tailored to specific applications and field conditions.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A crop residue apparatus for distribution of crop residue, the apparatus comprising:
    a pair of laterally spaced spreader devices for distributing crop residue laterally;
    a duct for directing a crop residue stream to the spreader devices in a downward direction; and
    deflectors spaced outward of the spreader devices and oriented generally in a vertical plane, the deflectors being mounted at a first upstream edge relative to the flow of the crop residue stream and extending downstream, the deflectors having a single upper edge beginning at a point adjacent the first upstream edge and curved toward the spreader devices to an increasing extent away from the upstream edge, wherein the upper edge of each deflector comprises generally triangular sections having their apexes coincide at a point adjacent the upstream edge.

2. The crop residue apparatus of claim 1, wherein the deflectors extend outwardly relative to their upstream edge.

3. The crop residue apparatus of claim 1, further comprising a pivotal mounting on the upstream edge of the deflectors.

4. The crop residue apparatus of claim 3, further comprising a crank arm on the deflectors for permitting adjustable positioning.

5. The crop residue apparatus of claim 1, wherein the deflectors are a unitary piece formed to provide the triangular sections.

6. A crop residue apparatus for distribution of crop residue, the apparatus comprising:
    a pair of laterally spaced spreader devices for distributing crop residue laterally;
    a duct for directing a crop residue stream to the spreader devices in a downward direction; and
    deflectors spaced outward of the spreader devices and oriented generally in a vertical plane, the deflectors being mounted at a first upstream edge relative to the flow of the crop residue stream and extending downstream, the deflectors having a single upper edge beginning at a point adjacent the first upstream edge and curved toward the spreader devices to an increasing extent away from the upstream edge, wherein the upper edge of each deflector comprises generally conical sections having their apexes coincide at a point adjacent the upstream edge.

7. The crop residue apparatus of claim 1, wherein the upper edge of the deflectors extend upward from a point adjacent the upstream edge.

8. The crop residue apparatus of claim 1, wherein the upper edge of the deflectors is pivotally connected to a point adjacent the upstream edge of the deflectors to provide a variable geometry upper edge.

9. An agricultural combine comprising:
    a crop processing apparatus configured for separating crop material from crop residue and for discharging crop residue therefrom;
    a duct for directing a stream of crop residue downstream in the agricultural combine in a generally downward direction;
    a pair of laterally spaced spreader devices positioned downstream of and below the crop residue duct for distributing crop residue laterally; and
    deflectors spaced outwardly of the spreader devices and oriented generally in a vertical plane, the deflectors being mounted at a first upstream edge relative to the flow of the crop residue stream and extending downstream, the deflectors having a single upper edge beginning at a point adjacent the first upstream edge and generally curved toward the spreader devices to an increasing extent away from the upstream edge, wherein the upper edge of each of the deflectors include one of generally triangular sections and conical, each having their apexes coinciding at a point adjacent the upstream edge.

10. The agricultural combine of claim 9, wherein the deflectors extend outwardly from their upstream edges.

11. The agricultural combine of claim 9, wherein the deflectors have a pivotal mounting on the upstream edge.

12. The agricultural combine of claim 11, wherein the deflectors have a crank arm for permitting adjustable positioning of the deflectors.

13. The agricultural combine of claim 9, wherein the deflectors are in a unitary piece formed to provide one of said triangular and conical sections.

14. The agricultural combine of claim 9, wherein the upper edge of the deflectors extend upwardly from the upstream end.

15. The agricultural combine of claim 9, wherein the upper edge of the deflectors is pivotally connected to a point adjacent the upstream edge of the deflectors to provide a variable geometry upper edge.

* * * * *